US012318792B2

(12) United States Patent
Zhang et al.

(10) Patent No.: US 12,318,792 B2
(45) Date of Patent: Jun. 3, 2025

(54) NOZZLE DEVICE FOR PLANT PROTECTION UNMANNED AERIAL VEHICLE AND DROPLET DIAMETER CONTROL METHOD THEREOF

(71) Applicant: INTELLIGENT EQUIPMENT RESEARCH CENTER, BEIJING ACADEMY OF AGRICULTURE AND FORESTRY SCIENCES, Beijing (CN)

(72) Inventors: Ruirui Zhang, Beijing (CN); Liping Chen, Beijing (CN); Longlong Li, Beijing (CN); Chenchen Ding, Beijing (CN); Tongchuan Yi, Beijing (CN)

(73) Assignee: INTELLIGENT EQUIPMENT RESEARCH CENTER, BEIJING ACADEMY OF AGRICULTURE AND FORESTRY SCIENCES, Haidian District (CN)

( * ) Notice: Subject to any disclaimer, the term of this patent is extended or adjusted under 35 U.S.C. 154(b) by 0 days.

(21) Appl. No.: 18/847,750

(22) PCT Filed: Jun. 24, 2024

(86) PCT No.: PCT/CN2024/100839

§ 371 (c)(1),
(2) Date: Sep. 17, 2024

(87) PCT Pub. No.: WO2025/002020

PCT Pub. Date: Feb. 1, 2025

(65) Prior Publication Data

US 2025/0108390 A1 Apr. 3, 2025

(30) Foreign Application Priority Data

Jun. 28, 2023 (CN) ......................... 202310776319.2

(51) Int. Cl.
*B05B 1/32* (2006.01)

(52) U.S. Cl.
CPC .................................... *B05B 1/326* (2013.01)

(58) Field of Classification Search
CPC ... F16K 7/02; F16K 7/04; F16K 7/045; B65D 47/205; B65D 47/2018; B65D 47/2037;
(Continued)

(56) References Cited

U.S. PATENT DOCUMENTS 3,776,470 A * 12/1973 Tsuchiya ................... B05B 1/32
239/533.13
4,709,900 A * 12/1987 Dyhr ......................... F16K 7/04
251/63.4

(Continued)

FOREIGN PATENT DOCUMENTS

| | | | |
|---|---|---|---|
| CN | 108533429 | A | 9/2018 |
| CN | 213051741 | U | 4/2021 |
| CN | 115999792 | A | 4/2023 |

*Primary Examiner* — Tuongminh N Pham
(74) *Attorney, Agent, or Firm* — WCF IP

(57) ABSTRACT

Provided are a nozzle device for a plant protection unmanned aerial vehicle and a droplet diameter control method thereof. The nozzle device for a plant protection unmanned aerial vehicle includes a flexible nozzle body, a magnetostrictive sleeve, and a coil. The flexible nozzle body is provided with a nozzle exit, a periphery of the flexible nozzle body is provided with a guide surface at a position corresponding to the nozzle exit, the magnetostrictive sleeve is sleeved on the periphery of the flexible nozzle body and abutted against the guide surface. The coil is wound around the periphery of the magnetostrictive sleeve. When the coil is supplied with a current to generate a magnetic field, the magnetostrictive sleeve can move relative to the guide surface, the guide surface squeezes the nozzle exit to deform the nozzle exit, thus adjusting the size of the nozzle exit.

8 Claims, 2 Drawing Sheets

(58) Field of Classification Search
CPC ............ F02M 51/0607; F02M 51/0603; B05B 17/0607; B05B 17/0646; B05B 1/326
See application file for complete search history.

(56) References Cited

U.S. PATENT DOCUMENTS

| | | | | |
|---|---|---|---|---|
| 8,464,750 | B1 * | 6/2013 | Richard ............. | G05D 16/2013<br>137/487.5 |
| 2017/0359943 | A1 * | 12/2017 | Calleija ............... | A01M 7/0089 |
| 2019/0128440 | A1 * | 5/2019 | Overskeid ............. | F16K 31/082 |

* cited by examiner

NOZZLE DEVICE FOR PLANT PROTECTION UNMANNED AERIAL VEHICLE AND DROPLET DIAMETER CONTROL METHOD THEREOF

CROSS-REFERENCE TO RELATED APPLICATION

This application is a national stage application of International Patent Application No. PCT/CN2024/100839, filed on Jun. 24, 2024, which claims priority of the Chinese Patent Application No. 202310776319.2, filed on Jun. 28, 2023, both of which are incorporated by references in their entities.

TECHNICAL FIELD

The present disclosure relates to the technical field of agricultural machinery, and in particular to a nozzle device for a plant protection unmanned aerial vehicle, and a droplet diameter control method thereof.

BACKGROUND

The effect of plant protection spraying is closely related to the factors such as droplet diameter, droplet drift and droplet settling speed, among which the droplet diameter plays a decisive role and is also one of the key factors that directly affect the spraying quality and operation effect of plant protection unmanned aerial vehicle.

In the practical application process, according to different working objects, it is necessary to change nozzles with different apertures frequently to obtain different droplet diameters. As the nozzle is a component of spraying instrument and the existing plant protection pressure nozzles all have a fixed-size, the sprayed droplet diameter cannot be changed by adjusting the size of the nozzle at any time, and thus the requirements of continuous operation cannot be satisfied.

SUMMARY

The present disclosure provides a nozzle device for a plant protection unmanned aerial vehicle, and a droplet diameter control method thereof, so as to solve the problem in the prior art that the droplet diameter cannot be changed by adjusting the size of the nozzle at any time.

In a first aspect, a nozzle device for a plant protection unmanned aerial vehicle is provided, including a flexible nozzle body, a magnetostrictive sleeve, and a coil. The flexible nozzle body is provided with a nozzle exit, a periphery of the flexible nozzle body is provided with a guide surface at a position corresponding to the nozzle exit, the magnetostrictive sleeve is sleeved on the periphery of the flexible nozzle body and abutted against the guide surface, the coil is wound around the periphery of the magnetostrictive sleeve. When the coil is supplied with a current, the magnetostrictive sleeve is movable relative to the guide surface to adjust a size of the nozzle exit of the flexible nozzle body.

According to the nozzle device for a plant protection unmanned aerial vehicle provided by the present disclosure, a free end of the magnetostrictive sleeve is abutted against the guide surface. When the free end of the magnetostrictive sleeve moves relative to the guide surface in a first direction, the size of the nozzle exit of the flexible nozzle body becomes smaller, and when the free end of the magnetostrictive sleeve moves relative to the guide surface in a second direction, the size of the nozzle exit of the flexible nozzle body becomes larger, and the first direction is opposite to the second direction.

According to the nozzle device for a plant protection unmanned aerial vehicle provided by the present disclosure, the nozzle device for a plant protection unmanned aerial vehicle further includes a control mainboard. The control mainboard is electrically connected to the coil, and the control mainboard is configured to determine a magnitude of the current according to the size of the nozzle exit.

According to the nozzle device for a plant protection unmanned aerial vehicle provided by the present disclosure, the coil is a coil PCB (printed circuit board) which is sleeved on the periphery of the magnetostrictive sleeve.

According to the nozzle device for a plant protection unmanned aerial vehicle provided by the present disclosure, a cross section of the guide surface is in a shape of right triangle, the magnetostrictive sleeve is abutted against a hypotenuse of the right triangle.

According to the nozzle device for a plant protection unmanned aerial vehicle provided by the present disclosure, the magnetostrictive sleeve is a hollow cylinder, and an inner side edge of the hollow cylinder is abutted against the guide surface.

According to the nozzle device for a plant protection unmanned aerial vehicle provided by the present disclosure, the nozzle device for a plant protection unmanned aerial vehicle further includes a pipeline and a pump. The pipeline is connected to the flexible nozzle body, and the pump is arranged on the pipeline.

According to the nozzle device for a plant protection unmanned aerial vehicle provided by the present disclosure, the guide surface is arranged around the periphery of the flexible nozzle body.

According to the nozzle device for a plant protection unmanned aerial vehicle provided by the present disclosure, the guide surface includes multiple guide surfaces, and the multiple guide surfaces are arranged around the periphery of the flexible nozzle body at intervals.

In a second aspect, a droplet diameter control method of a nozzle device for a plant protection unmanned aerial vehicle includes following steps:

- determining a target current according to a target size of the nozzle exit of the flexible nozzle body;
- supplying the target current to the coil.

A nozzle device for a plant protection unmanned aerial vehicle and a droplet diameter control method thereof are provided by the present disclosure, a guide surface is arranged at a nozzle exit, a magnetostrictive sleeve is abutted against the guide surface, and a coil is wound around the periphery of the magnetostrictive sleeve. When the coil is energized to generate a magnetic field, the magnetostrictive sleeve elongates downward and squeezes the guide surface, thus the nozzle exit is deformed as the guide surface is squeezed, leading to the size of the nozzle exit become smaller, and then the diameter of droplet ejected from the nozzle also becomes smaller. When the coil is powered off, the magnetostrictive sleeve returns to its original length, the guide surface returns to its original shape, the nozzle returns to its original size, and the diameter of droplet ejected from the nozzle also returns to its original state. The strength of the magnetic field generated by the coil can be changed by adjusting the magnitude of the current supplied to the coil, and an elongation length of the magnetostrictive sleeve can be controlled accordingly, thus achieving the purpose of changing the droplet diameter by adjusting the size of the nozzle exit. Without changing different types of nozzle exits, the size of the nozzle exit can be adjusted in real time, and then the droplet diameter can be controlled in real time, thus providing an accurate control means for the droplet diameter of the unmanned aerial vehicle plant protection operation.

BRIEF DESCRIPTION OF THE DRAWINGS

To describe the technical solutions of the present disclosure or in the prior art more clearly, the following briefly introduces the accompanying drawings required for describing the embodiments or the prior art. Apparently, the accompanying drawings in the following description show merely some embodiments of the present disclosure, and those of ordinary skill in the art may still derive other drawings from these accompanying drawings without creative efforts.

REFERENCE NUMERALS

Figure 1:
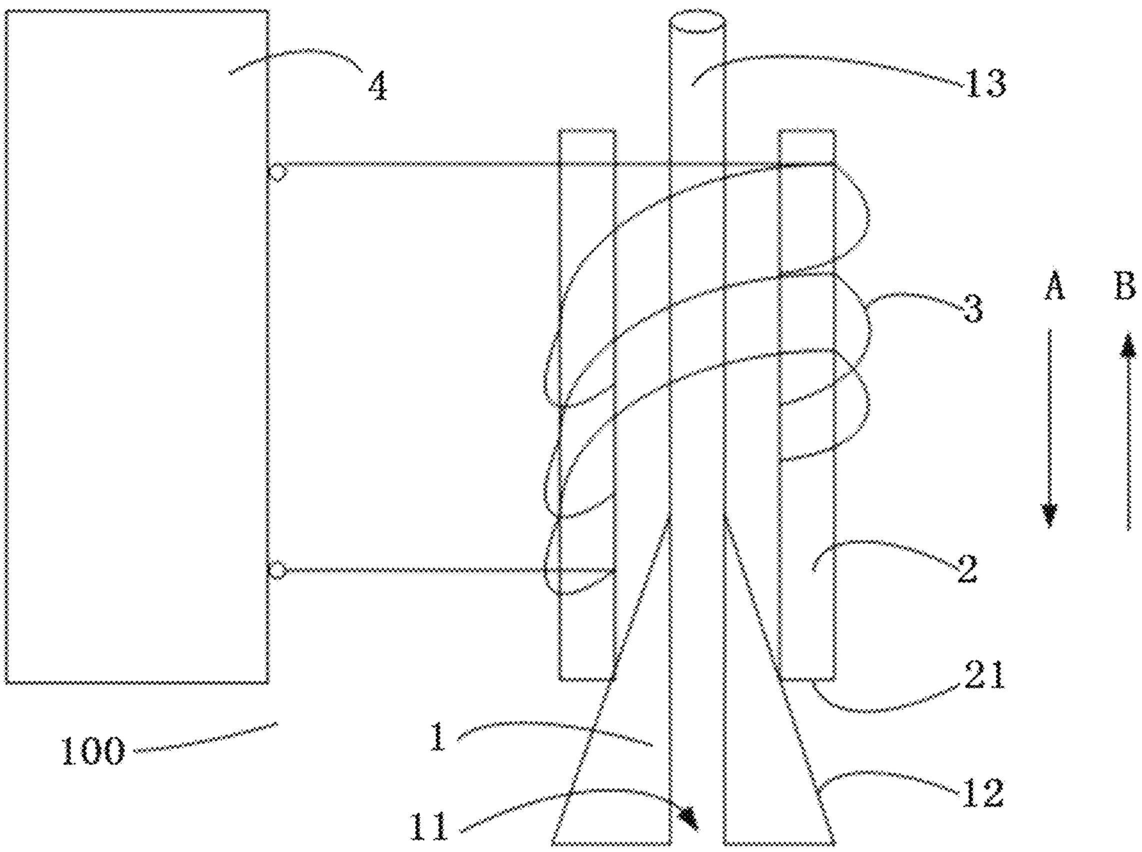
FIG. 1 is a structural diagram of a nozzle device for a plant protection unmanned aerial vehicle according to the present disclosure.

100 nozzle device for a plant protection unmanned aerial vehicle;
1 flexible nozzle body; 11 nozzle exit; 12 guide surface; 13 pipeline;
2 magnetostrictive sleeve; 21 free end;
3 coil;
4 control mainboard.

DETAILED DESCRIPTION OF THE EMBODIMENTS

To make the objectives, technical solutions and advantages of the present disclosure more clearly, the following clearly and completely describes the technical solutions in the embodiments of the present disclosure with reference to the accompanying drawings in the embodiments of the present disclosure. Apparently, the described embodiments are merely a part rather than all of the embodiments of the present disclosure. All other embodiments obtained by those of ordinary skill in the art based on the embodiments of the present disclosure without creative efforts shall fall within the protection scope of the present disclosure.

Thus, the terms of "first" and "second" in the specification and claims of the present disclosure can explicitly or implicitly include one or more features. In the description of the present disclosure, "a plurality of" means two or more, unless otherwise specifically defined. In addition, "and/or" in the specification and claims means at least one of connected objects.

In the description of the present disclosure, it needs to be understood that the orientation or positional relationship indicated by terms "close to", "away from" and "abutted against" is based on the orientation or positional relationship shown in the accompanying drawings only for convenience of description of the present disclosure and simplification of description rather than indicating or implying that the device or element referred to must have a particular orientation, be constructed and operate in a particular orientation, and thus are not to be construed as limiting the present disclosure.

In the present disclosure, unless expressly specified and limited otherwise, the terms "install" and "connect" should be understood broadly, which, e.g., may be a fixed connection, a detachable connection, or an integrated connection; may be a mechanical connection, or an electrical connection; may be a direct connection, an indirect connection via an intermediate medium, or an internal communication between two elements. For those of ordinary skill in the art, the specific meanings of the above terms in the present disclosure can be understood on a case-by-case basis.

Currently, small diaphragm pumps and pressure nozzles are usually installed on the plant protection unmanned aerial vehicle, and the droplet diameter is determined according to the technical parameters of pesticide application. In use, different droplet diameters can be obtained by selecting corresponding nozzles and setting the pressure of the fixed pipeline.

In the present disclosure, the pressure nozzle is used as an example for explanation. The principle of the pressure nozzle is that pesticide liquid is broken into fine droplets under the action of pressure generated by a liquid pump when passing through the nozzle, and the droplet diameter is mainly affected by the pressure and aperture of the nozzle. Therefore, the purpose of changing the droplet diameter can be achieved by adjusting the aperture of the pressure nozzle.

As shown in FIG. 1, a nozzle device for a plant protection unmanned aerial vehicle 100 in this embodiment includes a flexible nozzle body 1, a magnetostrictive sleeve 2, and a coil 3.

The flexible nozzle body 1 is provided with a nozzle exit 11, the periphery of the flexible nozzle body 1 is provided with a guide surface 12 at a position corresponding to the nozzle exit 11, and the magnetostrictive sleeve 2 is sleeved on the periphery of the flexible nozzle body 1, and abutted against the guide surface 12. The coil 3 is wound around the periphery of the magnetostrictive sleeve 2.

When the coil 3 is energized, the magnetostrictive sleeve 2 is movable relative to the guide surface 12 to adjust a size of the nozzle exit 11 of the flexible nozzle body 1.

Specifically, the flexible nozzle body 1 may be made of materials such as silica gel or latex. For example, the flexible nozzle body 1 is made of a material of silica gel having a applicable temperature range between 40° C. to 230° C., so that the flexible nozzle body 1 can work normally in high temperature weather and low temperature weather. Moreover, the silica gel has certain softness and resilience, and thus is easy to deform when squeezed by an external force, and can quickly recover to its original shape when the external force disappears. In addition, the silica gel has long service life and stable chemical performance, which saves the cost to a certain extent.

The flexible nozzle body 1 is provided with the nozzle exit 11, the pesticide liquid can be ejected through the nozzle exit 11 after entering the flexible nozzle body 1. The periphery of the flexible nozzle body 1 is provided with the guide surface 12 at a position corresponding to the nozzle exit 11, and the guide surface 12 is abutted against the magnetostrictive sleeve 2. In order to facilitate the magnetostrictive sleeve 2 to move along the guide surface 12, the guide surface 12 should have a certain length and slope, and the magnetostrictive sleeve 2 is abutted against a slope side of the guide surface 12.

It may be understood that as the guide surface 12 is located on the periphery of the flexible nozzle body 1, the nozzle exit 11 may be deformed with the movement of the magnetostrictive sleeve 2 along the guide surface 12, leading to the change of the size of the nozzle exit 11. With the change of the size of the nozzle exit 11, the droplet diameter is also changed. Therefore, in order to ensure that the guide surface 12 can be stably deformed with the movement of the magnetostrictive sleeve 2, the magnetostrictive sleeve 2 and the flexible nozzle body 1 can be integrally formed to improve the structural integration.

The magnetostrictive sleeve 2 is made of a magnetostrictive material which may elongate or shorten in a magnetization direction when being magnetized in a magnetic field. That is to say, when the magnetostrictive sleeve 2 is located in the magnetic field, the size of the magnetostrictive sleeve 2 will be changed significantly when the current flowing through the coil 3 changes; and the magnetostrictive sleeve 2 can return to its original size after an external magnetic field is removed. That is also to say, the strength of the magnetic field generated by the coil 3 can be changed by adjusting the magnitude of the current supplied to the coil, and thus the elongation length of the magnetostrictive sleeve 2 can be controlled, so that the purpose of changing the droplet diameter by adjusting the size of the nozzle exit 11 can be realized.

The magnetostrictive sleeve 2 may be made of materials such as a nickel-based alloy, an iron-based alloy, piezoelectric ceramic or rare earth giant magnetostrictive material, and can be selected according to the actual situation, which is not specifically limited here.

The coil 3 is configured to provide a magnetic field for the magnetostrictive sleeve 2, thus the coil 3 is wound around the magnetostrictive sleeve 2 to make the magnetostrictive sleeve 2 in a stable magnetic field environment. When the coil 3 is energized to generate the magnetic field, the magnetostrictive sleeve 2 can elongate. When the coil 3 is powered off, the magnetic field disappears, and the magnetostrictive sleeve 2 returns to its original length.

Exemplary, when the coil 3 is energized to generate a magnetic field, the magnetostrictive sleeve 2 elongates downwards along the guide surface 12 to make the guide surface 12 squeeze toward the nozzle exit 11. The nozzle exit 11 is deformed after being squeezed by the guide surface 12 and becomes smaller, so that the diameter of droplet ejected from the nozzle exit 11 becomes smaller. When the coil 3 is powered off and the magnetic field disappears, the magnetostrictive sleeve 2 returns to its original length, a squeezing force on the guide surface 12 disappears, the deformation of the nozzle exit 11 disappears simultaneously, the nozzle exit 11 returns to its original size, so that the diameter of droplet ejected from the nozzle exit 11 also returns to its original state. It needs to be noted that the original length, the original size and the original state all indicate the situation when the coil 3 is not energized.

It may be understood that the periphery of the flexible nozzle body 1 is provided with the guide surface 12 at a position corresponding to the nozzle exit 11, the magnetostrictive sleeve 2 is abutted against the guide surface 12, and the coil 3 is wound around the periphery of the magnetostrictive sleeve 2. When the coil 3 is energized to generate a magnetic field, the magnetostrictive sleeve 2 elongates downward to squeeze the guide surface 12, thus the nozzle exit 11 is deformed as the guide surface 12 is squeezed, the size of the nozzle exit 11 becomes smaller, so that the diameter of droplet ejected from the nozzle exit 11 also becomes smaller accordingly. When the coil 3 is powered off, the magnetostrictive sleeve 2 returns to its original length, the guide surface 12 returns to its original shape, the nozzle exit 11 returns to its original size, and the diameter of droplet ejected from the nozzle exit 11 also returns to its original state.

In this embodiment of the present disclosure, the strength of the magnetic field generated by the coil 3 can be changed by adjusting the magnitude of the current supplied to the coil 3, so that an elongation length of the magnetostrictive sleeve 2 can be controlled, thus achieving the purpose of changing the droplet diameter by adjusting the size of the nozzle exit 11. The size of the nozzle exit 11 can be adjusted in real time without changing different types of nozzle exits 11, and then the droplet diameter can be controlled in real time, thus providing an accurate control means for the droplet diameter of the plant protection operation of the unmanned aerial vehicle.

In an optional embodiment, as shown in FIG. 1, a free end 21 of the magnetostrictive sleeve 2 is abutted against the guide surface 12. When the free end 21 of the magnetostrictive sleeve 2 moves relative to the guide surface 12 in a first direction, the size of the nozzle exit 11 of the flexible nozzle body 1 becomes smaller. When the free end 21 of the magnetostrictive sleeve 2 moves relative to the guide surface 12 in a second direction, the size of the nozzle exit 11 of the flexible nozzle body 1 becomes larger, and the first direction is opposite to the second direction.

The first direction refers to a direction close to the nozzle exit 11, and the second direction refers to a direction away from the nozzle exit 11. For example, the first direction may be direction A in FIG. 1, and the second direction may be direction B in FIG. 1.

Specifically, when the coil 3 is energized, the magnetostrictive sleeve 2 moves relative to the guide surface 12. Actually, the free end 21 of the magnetostrictive sleeve 2 moves relative to the guide surface 12 in the first direction or the second direction, that is, the free end 21 of the magnetostrictive sleeve 2 is abutted against the guide surface 12.

In addition, in order to make the free end 21 accurately move along the guide surface 12, the magnetostrictive sleeve 2, except the free end 21, should be fixed.

Due to the fact that the guide surface 12 is made of a flexible material, while the hardness of the magnetostrictive sleeve 2 is higher than that of the flexible material, in order to prevent the free end 21 from damaging the guide surface 12 during movement of the free end 21 and improve the movement smoothness of the free end 21, a portion, abutted against the guide surface 12, of the free end 21 is provided as a circular arc.

In this embodiment of the present disclosure, when the coil 3 is energized, with the elongation of the magnetostrictive sleeve 2, the free end 21 moves relative to the guide surface 12 in the first direction to squeeze the guide surface 12, the nozzle exit 11 is deformed after being squeezed by the guide surface 12, making the size of the nozzle exit 11 become smaller, so that the diameter of droplet ejected from the nozzle exit 11 become smaller. When the magnitude of the current in the coil 3 becomes smaller, the magnetostrictive sleeve 2 gradually shortens, the free end 21 moves relative to the guide surface 12 in the second direction, the squeezing pressure on the guide surface 12 is reduced, the amount of deformation of the nozzle exit 11 is reduced, the size of the nozzle exit 11 becomes larger, so that the diameter of droplet ejected from the nozzle exit 11 also becomes larger. When the coil 3 is powered off, the magnetostrictive sleeve 2 returns to its original length, and the free end 21 moves relative to the guide surface 12 in the second direction until the free end 21 is abutted against the guide surface 12, then the guide surface 12 returns to its original state, the nozzle exit 11 returns to its original size, and the diameter of droplet ejected from the nozzle exit 11 also returns to its original size.

In an optional embodiment, as shown in FIG. 1, the nozzle device for a plant protection unmanned aerial vehicle 100 further includes a control mainboard 4. The control mainboard 4 is electrically connected to the coil 3, and the control mainboard 4 is configured to determine the magnitude of the current according to the size of the nozzle exit 11.

Specifically, the magnetostrictive sleeve 2 moves under the action of the magnetic field, and the nozzle exit 11 is deformed by squeezing the guide surface 12, thus changing the size of the nozzle exit 11, and the amount of deformation is related to the magnitude of the current supplied to the coil 3. That is, the smaller the magnitude of the current supplied to the coil 3, the smaller the amount of deformation of the nozzle exit 11. The larger the magnitude of the current supplied to the coil 3, and the greater the amount of deformation of the nozzle exit 11. Therefore, by calibrating the current provided by the control mainboard 4 and the size of the nozzle exit 11, a corresponding control signal can be obtained. In practical application, the size of the nozzle exit 11 can be controlled only by selecting the corresponding control signal according to requirements of the set droplet diameter, thus obtaining the set droplet diameter.

In addition, the control mainboard 4 may also be remotely connected to a terminal, e.g., a mobile phone and a computer, thus adjusting the size of the nozzle exit 11 in real time, and satisfying the requirements of actual continuous operation.

In an optional embodiment, the coil 3 is a coil PCB (printed circuit board), and the coil PCB is sleeved on the periphery of the magnetostrictive sleeve 2.

Specifically, the coil 3 is directly printed on the PCB, which, compared with a way of directly winding the coil 3 around the magnetostrictive sleeve 2, can reduce the assembly space, and eliminate the difference of magnetic field characteristics caused by inconsistent winding, such that all parts of the magnetostrictive sleeve 2 are in the same magnetic field environment, the lengths of all parts of the magnetostrictive sleeve 2 are consistent when stretched in the magnetic field environment, thus the size of the nozzle exit 11 can be controlled more accurately.

In an optional embodiment, as shown in FIG. 1, the cross-section of the guide surface 12 is in a shape of right triangle, and the magnetostrictive sleeve 2 is abutted against a hypotenuse of the right triangle. For example, the guide surface 12 may be in a shape of circular cone, which is arranged around the periphery of the nozzle exit 11, and the bottom surface of the circular cone is flush with the nozzle exit 11.

Specifically, when the cross-section of the guide surface 12 is in a shape of right triangle, one right-angle side of the right triangle contacts with the periphery of the nozzle exit 11, the other right-angle side is flush with the nozzle exit 11, and the free end 21 of the magnetostrictive sleeve 2 is abutted against the hypotenuse of the right triangle. When the coil 3 is energized to generate a magnetic field, the free end 21 moves on the hypotenuse of the right triangle in the first direction or the second direction.

In an optional embodiment, as shown in FIG. 1, the magnetostrictive sleeve 2 is a hollow cylinder, and an inner side edge of the hollow cylinder is abutted against the guide surface 12. The inner side edge of the hollow cylinder refers to one side, close to the flexible nozzle body 1, of the hollow cylinder. The magnetostrictive sleeve 2 is hollow to reduce the weight of the nozzle device for a plant protection unmanned aerial vehicle.

Specifically, when the coil 3 is energized to generate a magnetic field, the inner side edge of the hollow cylinder moves on the guide surface 12 in the first direction or the second direction, that is, the inner side edge of the hollow cylinder sequences the guide surface 12, such that the nozzle exit 11 is deformed after being squeezed by the guide surface 12.

In an optional embodiment, as shown in FIG. 1, the nozzle device for a plant protection unmanned aerial vehicle 100 further includes a pipeline 13 and a pump. The pipeline 13 is connected to the flexible nozzle body 1, and the pump is arranged on the pipeline 13.

Specifically, the pipeline 13 may be connected to one end, away from the nozzle exit 11, of the flexible nozzle body 1, or part of the pipeline 13 can extend into the flexible nozzle body 1, so that the pipeline 13 is tightly connected to the flexible nozzle body 1 closer, avoiding the pesticide liquid from leaking.

In brief, when the nozzle device for a plant protection unmanned aerial vehicle 100 operates, the pesticide liquid flows through the pipeline 13, and then is ejected through the nozzle exit 11 under the driving of the pump.

In an optional embodiment, in order to improve the movement stability of the magnetostrictive sleeve 2, the guide surface 12 is arranged around the periphery of the flexible nozzle body 1.

As the magnetostrictive sleeve 2 moves on the guide surface 12, the guide surface 12 squeezes the nozzle exit 11 to make the nozzle exit 11 deform to a certain extent, thus adjusting the size of the nozzle exit 11. Therefore, the guide surface 12 is arranged around the periphery of the flexible nozzle body 1, which can synchronously adjust the size of the nozzle exit 11 at different angles and improve the efficiency and accuracy of adjusting of the size of the nozzle exit 11.

In an optional embodiment, multiple guide surfaces 12 are provided, and the multiple guide surfaces 12 are arranged around the periphery of the flexible nozzle body 1 at intervals.

Specifically, the guide surface 12 may be in a shape of independent right triangle pyramid, and the multiple independent guide surfaces 12 are arranged on the periphery of the flexible nozzle body 1 at intervals. For example, four guide surfaces 12 are provided, which are arranged at intervals of 90 degrees. Correspondingly, four magnetostrictive sleeves are provided and abutted against hypotenuses of the four guide surfaces 12 in one-to-one correspondence. Alternatively, there may be one magnetostrictive sleeve 2 sleeving on the periphery of the hypotenuses of the four guide surfaces 12.

Figure 2:
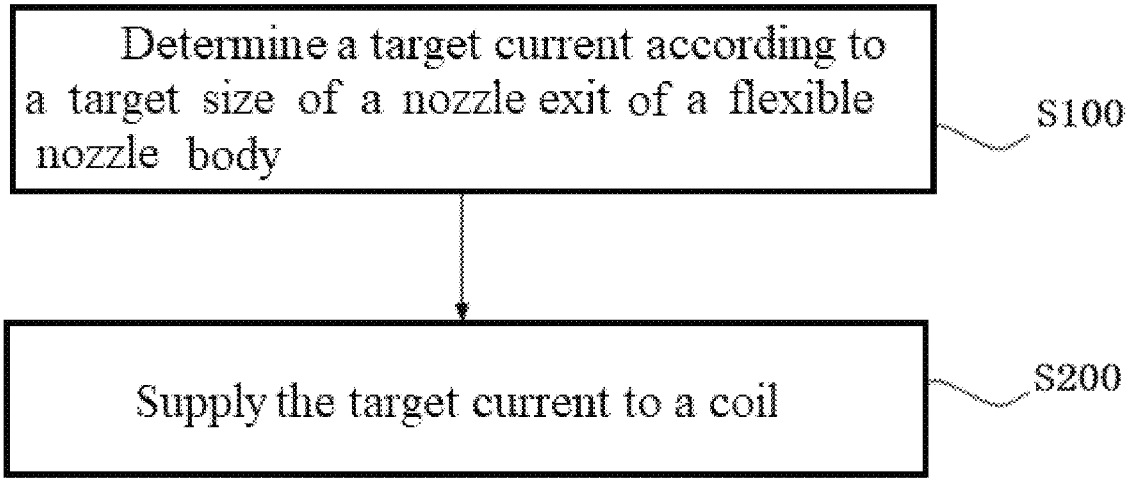
FIG. 2 is a flowchart of a droplet diameter control method of the nozzle device for a plant protection unmanned aerial vehicle according to the present disclosure.

In addition, as shown in FIG. 2, a droplet diameter control method of a nozzle device for a plant protection unmanned aerial vehicle 100 includes the following steps:

- S100, a target current is determined according to a target size of the nozzle exit 11 of the flexible nozzle body 1; and
- S200, the target current is supplied to the coil 3.

Insecticide for controlling flying pests has a droplet diameter from 10 microns to 50 microns. Insecticide for controlling leaf reptile pests has a droplet diameter from 40 microns to 100 microns. Bactericide for controlling plant diseases has a droplet diameter from 30 microns to 150 microns. Contact herbicide has a droplet diameter from 100 microns to 300 microns. Therefore, in different plant protection situations, it is necessary to choose different droplet diameters to maximize the efficacy of the pesticide liquid.

The size of the nozzle exit 11 of the flexible nozzle body 1 is related to the amount of deformation of the nozzle exit 11, while the amount of deformation of the nozzle exit 11 is related to the amount of movement of the free end 21 of the magnetostrictive sleeve 2 on the guide surface 12, and the amount of movement of the free end 21 is related to the magnitude of the current in the coil 3. The greater the magnitude of the supplied current, the greater the amount of movement of the free end 21, the greater the amount of deformation of the nozzle exit 11, and the smaller the size of the nozzle exit 11. Conversely, the greater the size of the nozzle exit 11.

In an embodiment of the present disclosure, in different plant protection situations, by calibrating the target size and target current of the nozzle exit 11 and supplying the corresponding target current to the coil 3, the size of the nozzle exit 11 can be changed. That is, by calibrating the current provided by the control main board 4 and the size of the nozzle exit 11, a corresponding control signal can be obtained, the control signal is configured to control the target current to achieve the real-time adjustment of the size of the nozzle exit 11, such that the droplet diameter can be controlled in real time, thus providing an accurate control means for the droplet diameter of the unmanned aerial vehicle plant protection operation.

Specifically, it should be noted finally that the above embodiments are only used to illustrate the technical solution of the present disclosure rather than limiting. Although the present disclosure has been described in detail with reference to the foregoing embodiments, those of ordinary skill in the art should understand that it is still possible to modify the technical solution described in the foregoing embodiments, or to replace some technical features with equivalents. However, these modifications or substitutions do not make the essence of the corresponding technical solutions deviate from the spirit and scope of the technical solutions of various embodiments of the present disclosure.

What is claimed is:

1. A nozzle device for a plant protection unmanned aerial vehicle, comprising a flexible nozzle body, a magnetostrictive sleeve, and a coil, wherein the flexible nozzle body is provided with a nozzle exit, a periphery of the flexible nozzle body is provided with a guide surface at a position corresponding to the nozzle exit, the magnetostrictive sleeve is sleeved on the periphery of the flexible nozzle body and abutted against the guide surface, the coil is wound around the periphery of the magnetostrictive sleeve;

when the coil is supplied with a current, the magnetostrictive sleeve is movable relative to the guide surface to adjust a size of the nozzle exit of the flexible nozzle body; a free end of the magnetostrictive sleeve is abutted against the guide surface, when the free end of the magnetostrictive sleeve moves relative to the guide surface in a first direction, the size of the nozzle exit of the flexible nozzle body becomes smaller, and when the free end of the magnetostrictive sleeve moves relative to the guide surface in a second direction, the size of the nozzle exit of the flexible nozzle body becomes larger, and the first direction is opposite to the second direction, wherein the first direction is oriented toward the nozzle exit and the second direction is oriented away from the nozzle exit;

the magnetostrictive sleeve is a hollow cylinder, and an inner side edge of the hollow cylinder is abutted against the guide surface;

a cross section of the guide surface is in a shape of right triangle, the magnetostrictive sleeve is abutted against a hypotenuse of the right triangle;

the guide surface is arranged around the periphery of the flexible nozzle body; and the flexible nozzle body is made of a silica gel or latex material.

2. The nozzle device for a plant protection unmanned aerial vehicle according to claim 1, further comprising a control mainboard, wherein the control mainboard is electrically connected to the coil, and the control mainboard is configured to determine a magnitude of the current according to the size of the nozzle exit.

3. The nozzle device for a plant protection unmanned aerial vehicle according to claim 1, wherein the coil is a coil PCB (printed circuit board) which is sleeved on the periphery of the magnetostrictive sleeve.

4. The nozzle device for a plant protection unmanned aerial vehicle according to claim 1, wherein the guide surface comprises a plurality of guide surfaces, and the plurality of guide surfaces are arranged around the periphery of the flexible nozzle body at intervals.

5. A droplet diameter control method of the nozzle device for a plant protection unmanned aerial vehicle according to claim 1, comprising following steps:

determining a target current according to a target size of the nozzle exit of the flexible nozzle body;

supplying the target current to the coil.

6. The droplet diameter control method of the nozzle device for a plant protection unmanned aerial vehicle according to claim 5, the nozzle device for a plant protection unmanned aerial vehicle further comprises a control mainboard, wherein the control mainboard is electrically connected to the coil, and the control mainboard is configured to determine a magnitude of the current according to the size of the nozzle exit.

7. The droplet diameter control method of the nozzle device for a plant protection unmanned aerial vehicle according to claim 5, wherein the coil is a coil PCB (printed circuit board) which is sleeved on the periphery of the magnetostrictive sleeve.

8. The droplet diameter control method of the nozzle device for a plant protection unmanned aerial vehicle according to claim 5, wherein the guide surface comprises a plurality of guide surfaces, and the plurality of guide surfaces are arranged around the periphery of the flexible nozzle body at intervals.

* * * * *